Oct. 1, 1946.   A. NORVIG   2,408,575
GARMENT FOR ANIMALS
Filed Sept. 18, 1943
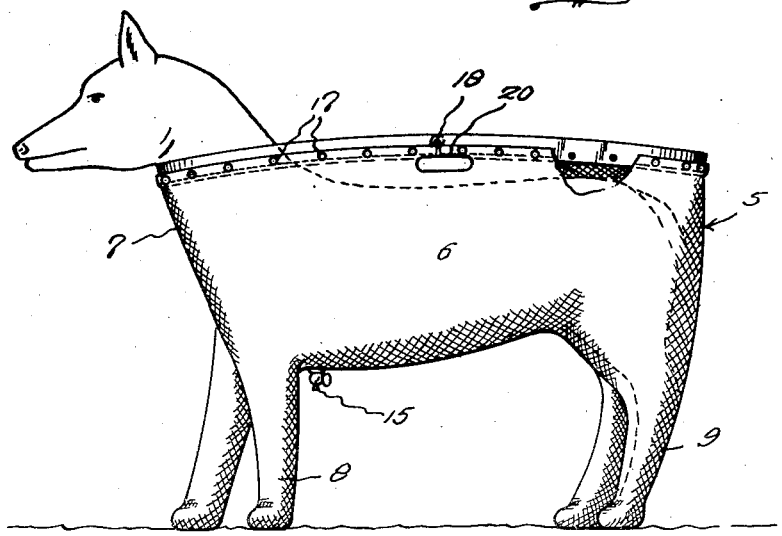
Fig. 1.
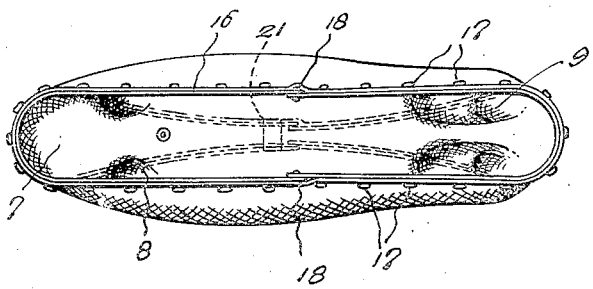
Fig. 2.
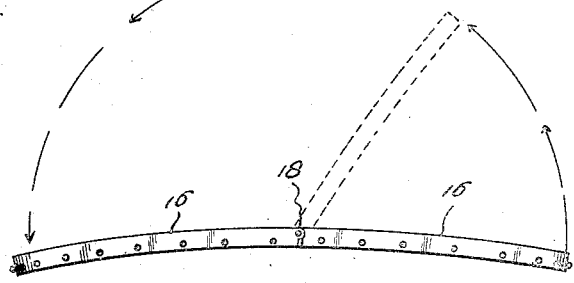
Fig. 3.
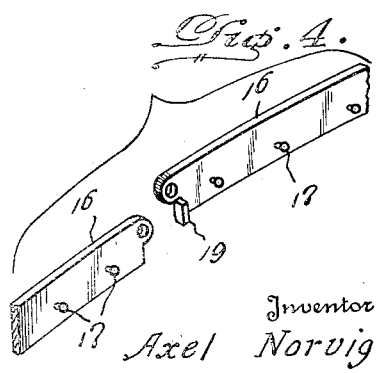
Fig. 4.
Fig. 5.
Inventor
Axel Norvig,
By McMorrow
Attorneys Patented Oct. 1, 1946

2,408,575

UNITED STATES PATENT OFFICE 2,408,575

GARMENT FOR ANIMALS

Axel Norvig, Brooklyn, Conn.

Application September 18, 1943, Serial No. 502,975

2 Claims. (Cl. 119—156)

This invention relates to a garment especially adapted for the extermination of vermin and the like on animals and for carrying out various kinds of treatments or the application of remedies to the animals.

The primary object of the invention is the provision of a device of the above stated character which will be extremely simple to apply and remove from an animal and when applied will envelop substantially the entire animal, except for instance, the head of the animal, so that the extermination of vermin may be accomplished by immersion in a disinfectant or other exterminating chemical, either in liquid or gaseous form.

Another object of the invention is the provision of a garment so constructed as to provide means for the restraint of the animal when applied, to permit the person to conveniently handle the animal and also to assist in maintaining the garment on the animal with a comparatively snug fit.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation, partly broken away, showing a preferred form of my invention.

Figure 2 is a top plan view illustrating the preferred form of the invention.

Figure 3 is a side elevation illustrating a collapsible flexible frame employed in the construction of my preferred form of the invention.

Figure 4 is a fragmentary perspective view illustrating adjacent ends of the frame.

Figure 5 is a perspective view illustrating a retaining clip.

Referring in detail to the drawing, the numeral 5 indicates as an entirety the garment which consists of a body portion 6, a neck portion 7 and front and rear pairs of appendages 8 and 9, completely closed except for their communication with the interior of the body portion 6.

An opening extending both into the body portion and neck permits an animal to be easily placed within the garment with the front and rear legs arranged within the front and rear appendages 8 and 9. The garment 5 will then substantially encase the animal except a very limited portion of the neck and the head, and to facilitate in handling of the animal after being placed in the garment.

The open edges of the garment when the latter is applied to the animal, extend a limited distance above the back of the animal and when separated will permit disinfectant or exterminating chemical in liquid form to be placed in the garment substantially submerging the major portion of the animal, so as to act in the capacity of destroying whatever vermin may be on the animal.

It is to be understood that after the fluid has been arranged in the garment, the open edges are brought together by means still to be described. The animal may be left in the garment immersed within the fluid as long as it is deemed necessary for the destruction of the vermin.

If desired, a disinfectant in gaseous form under pressure may be introduced into the garment by partly opening the latter with the animal therein so that the gaseous disinfectant may act in the destruction of the vermin on the animal, also it is to be understood that the garment may also be employed for giving the animal medicinal treatments. The medicine either in gaseous or liquid form may be placed in the garment while the animal is therein.

The garment is equipped with a drain valve 15 of any suitable construction whereby the fluid may be drained from the garment after its action on the animal.

The garment is equipped along its open edges with a flexible collapsible frame 16, suitable fasteners 17 being employed for securing of the garment to the frame. The frame is composed of a pair of substantially U-shaped portions pivotally connected, as shown at 18, whereby the frame may be folded when the device is not in use. The adjacent ends of the sections of the frame are apertured to receive the pivot pins and the ends of one section have formed thereon laterally extending projections or stops 19 to abut the adjacent ends of the other section of the frame to limit the pivotal movement of the frame sections in one direction.

The body portion of the garment adjacent its open edges and the frame is provided with hand openings 20 so that a person may pass the fingers of a hand through the garment and grip both sides of the frame, drawing the sides together causing the garment to become closed on the animal. As soon as the sides of the frame are released, they spread apart to open the garment to facilitate the removal or placing of the animal in the garment.

A clip 21 may be positioned over the sides of the frame when they have been drawn together for retaining the frame in the dotted line position, as shown in Figure 2. This clip when applied will retain the garment closed on the animal so that the person may be left free to use both hands for carrying out the different treatments on the animal.

The garment is constructed of any material suitable for the purpose except it must be leakproof and also be capable of preventing the seepage of gas therethrough.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a garment of the class described, a body portion including appendages closed except for communication with the body portion and a neck portion, said body portion having an opening extending into the neck portion to permit an animal to be arranged therein with the head of the animal located exteriorly of the body portion, drain means for the body portion, and a foldable flexible frame secured to the body and neck portions at their openings and manually flexed for constricting the upper edge of the body and neck portions about the animal, said garment having finger openings adjacent to the frame.

2. In a garment of the class described, a body portion including appendages closed except for communication with the body portion and a neck portion, said body portion having an opening extending into the neck portion to permit an animal to be arranged therein with the head of the animal located exteriorly of the body portion, drain means for the body portion, a foldable flexible frame secured to the body and neck portions at their openingss and manually flexed for constricting the upper edge of the body and neck portions about the animal, said garment having finger openings adjacent to the frame, and a spring clip applicable to the frame when flexed to sustain the body and neck portions in their constricted positions about the animal.

AXEL NORVIG.